United States Patent [19]
Dooley

[11] 3,734,352
[45] May 22, 1973

[54] DISPENSING SYSTEM

[75] Inventor: Dan W. Dooley, Lake Oswego, Oreg.

[73] Assignee: Kenneth E. McCarthy, Portland, Oreg.

[22] Filed: Sept. 11, 1970

[21] Appl. No.: 71,399

[52] U.S. Cl..................................222/148, 222/250
[51] Int. Cl.............................................G01f 11/06
[58] Field of Search.....................222/249, 250, 389, 222/148; 417/349, 393; 184/39, 7 D, 7 E; 73/239, 249

[56] References Cited

UNITED STATES PATENTS

| 1,963,663 | 6/1934 | Kerns | 73/239 X |
|---|---|---|---|
| 3,081,913 | 3/1963 | Rotter | 222/250 |
| 2,719,603 | 10/1955 | LeClair | 184/7 E X |
| 1,943,838 | 1/1934 | Reswick | 184/7 D X |
| 3,484,207 | 12/1969 | Anthon | 222/148 X |

*Primary Examiner*—Robert B. Reeves
*Assistant Examiner*—Francis J. Bartuska
*Attorney*—Buckhorn, Blore, Klarquist and Sparkman

[57] ABSTRACT

A dispensing system for viscous substances includes a pneumatically operated dispensing cylinder and a pilot-operated spool valve which are both controlled by a common control valve. In one position of the control valve, a substance to be dispensed is forced through the pilot-operated spool valve into the dispensing cylinder. In a second position of the control valve, the dispensing cylinder forces a charge outwardly through the pilot-operated valve, which is controlled for providing an outlet for the dispensed substance.

6 Claims, 2 Drawing Figures

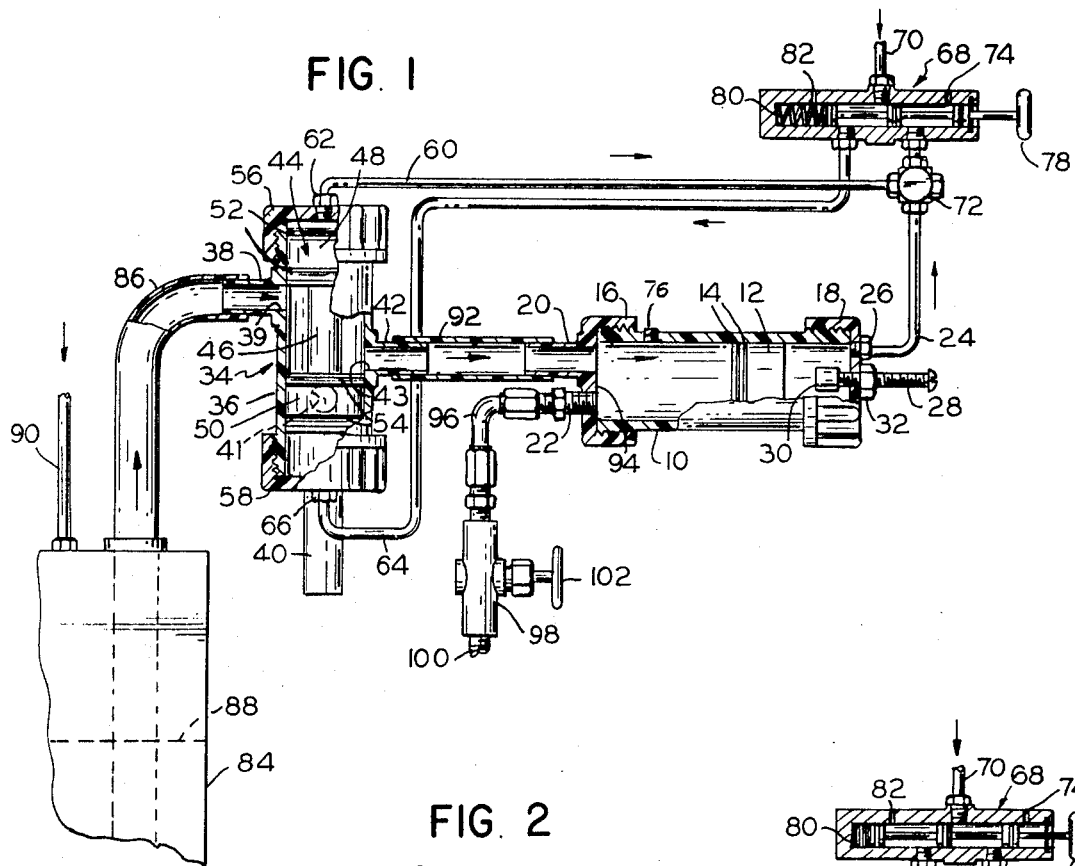
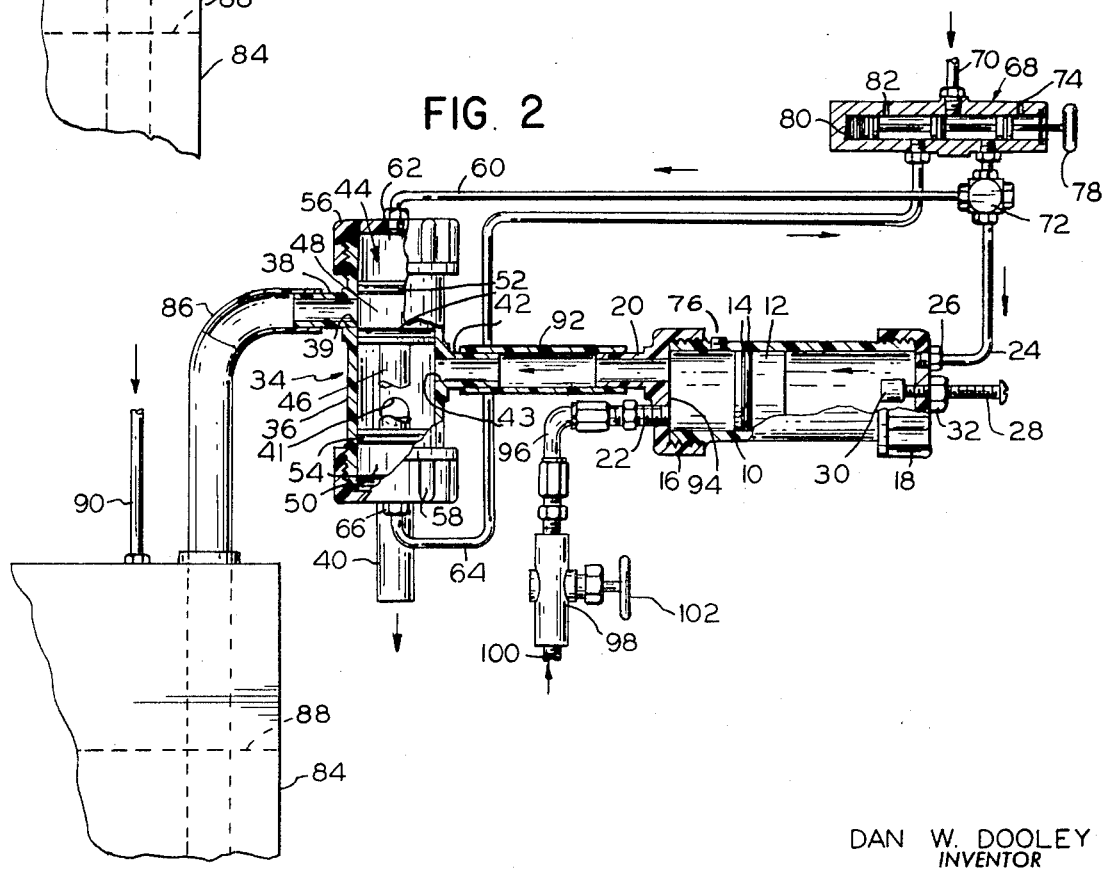

DISPENSING SYSTEM

BACKGROUND OF THE INVENTION

Conventional dispensing systems for liquids, such as soft drinks or the like, generally comprise a pressurized supply and a dispensing valve which is automatically opened for a predetermined period of time, such that a predetermined quantity of liquid will be delivered therethrough. While systems of this type are suitable for many liquids, they are not entirely suitable for more viscous substances such as syrups, custards, jellies, and the like, or nearly dry materials such as putty. Delivery valve control becomes difficult and the amount of substance delivered in a given period of time may vary. The variation in quantity of material delivered is aggravated even further if the consistency of the substance is not constant, e.g. as in the case of pickle relish for restaurant dispensing.

Various complex dispensing systems have been devised wherein a predetermined quantity of material will be delivered by the stroke of a dispensing piston. However, such systems usually involve spring-biased check valves or hand-operated valves which are not suitable for the quick and accurate dispensing of a viscous substance or one of a non-constant consistency.

It is therefore an object of the present invention to provide an improved dispensing system for automatically dispensing a predetermined quantity of a viscous or non-uniform substance.

It is another object of the present invention to provide an improved dispensing system for conveying a predetermined quantity of a viscous substance or the like, wherein such system is conveniently remote controlled or whereby a plurality of dispensing systems may be simultaneously operated.

It is a further object of the present invention to provide an improved dispensing system for delivering a predetermined quantity of semibulk or nearly dry material without interference with valve operation.

It is another object of the present invention to provide an improved dispensing system where the system may be quickly and easily flushed for preserving cleanliness in handling food items and the like.

SUMMARY OF THE INVENTION

According to the present invention, a dispensing cylinder includes a floating piston which is pneumatically operated on one side for delivering a charge of dispensed material through a pilot-operated spool valve. The pilot-operated spool valve is operated simultaneously with the dispensing cylinder for supplying material to the dispensing cylinder and conveying material from the dispensing cylinder.

In a first position of a pneumatic control valve, a substance to be dispensed is pressure delivered through the pilot-operated spool valve to a first end of the dispensing cylinder. In a delivery position of the pneumatic control valve, the operation of the pilot-operated valve is changed by pilot pressure, while the piston in the dispensing cylinder is simultaneously actuated, for delivering a charge of material through the pilot-operated valve to an outlet.

The pilot-operated valve desirably comprises a cylinder in which a spool moves longitudinally, such spool comprising a central shaft connecting a pair of lands which are at least twice as large in diameter as the shaft. The interior of the pilot valve cylinder is cylindrical except for substantially round ports, and the pilot-operated valve is actuated smoothly for delivering the desired quantity of a viscous substance or the like either to or from the dispensing cylinder. The movement of the spool is efficacious in severing pieces of semibulk substances, whereby conveyance of these substances is smooth and accurate. Not only does the construction of the pilot-operated valve positively control the flow of difficult substances, but also this construction facilitates adequate cleaning of the system as when food elements are being conveyed.

The subject matter which I regard as my invention is particularly pointed out and distinctly claimed in the concluding portion of this specification. The invention, however, both as to organization and method of operation, together with further advantages and objects hereof, may best be understood by reference to the following description taken in connection with the accompanying drawings wherein like reference characters refer to like elements.

DRAWINGS

FIG. 1 is a view, partially in cross section, illustrating a dispensing system according to the present invention in a normal or ready mode, and FIG. 2 is a view of the same system illustrating the positions of various system elements for the dispensing of a substance.

DETAILED DESCRIPTION

Referring to the drawings, the system according to the present invention includes a dispensing cylinder 10 having a free-floating piston 12 therewithin. The piston is provided with one or more piston ring seals 14 for preventing the flow of material past the cylinder. The cylinder also includes a first end cap 16 and a second end cap 18 which, like the body of the cylinder and piston 12, are desirably formed of plastic. First end cap 16 has an integrally molded exit and entrance conduit 20 extending longitudinally therefrom, and is also tapped to receive a flushing connection 22. Second end cap 18 is tapped for receiving a pnuematic line 24, secured in position by nut 26, while an adjustable stop 28 extends axially into the cylinder 10. Stop 28 comprises a threaded bolt having a plastic bumper 30 secured to the threaded end thereof for limiting the movement of piston 12 at the right end of the cylinder. Nut 32 is employed for locking the stop 28 in a predetermined position.

The system also includes a three-way spool valve 34 which is pilot-operated pneumatically. Valve 34 comprises a right circular plastic cylinder 36 which is similar to dispensing cylinder 10 except for the addition of an upper entrance conduit 38, a lower exit conduit 40 and a central conduit 42 which are integrally molded with plastic cylinder 36 and extend from the sides thereof. The respective conduits 38, 40 and 42 form substantially circular ports 39, 41 and 43 where these conduits intersect the inside wall of cylinder 36, this inside wall being substantially straight and cylindrical except for these ports.

Pilot-operated spool valve 34 includes a sliding spool 44 therewithin comprising an axial central shaft 46 joining a pair of piston ends or lands 48 and 50. The entire spool 44 is suitably formed of plastic and is provided with piston ring seals 52 and 54 at the upper and lower lands thereof. The lands and central shaft are cylindrical.

An upper plastic cap 56 and a lower plastic cap 58 are suitably received at the upper and lower ends of cylinder 36. Cap 56 is centrally tapped to receive pneumatic line 60 secured by locknut 62, while cap 58 is tapped to receive pneumatic line 64 which is locked by means of nut 66, and pilot operation of the valve is accomplished by air pressure supplied.

The lands 48 and 50 are advantageously at least twice the diameter of shaft 46 leaving ample room between the shaft and the cylinder wall minimizing restriction to the passage of dispensed material of high viscosity or containing solid particles. The relatively large lands also facilitate the force of movement thereof by the pilot air pressure from the lines 60 and 64. The ports 39, 41 and 43 have a diameter suitably approximately equal to the difference in diameter between the central shaft 46, and the lands, for likewise minimizing mass restriction and enabling the ready and uninterrupted delivery of the dispensed substance which may, for example, contain semi-solid elements, and/or which may be viscous. The ports preferably should have a diameter of at least approximately three-eighths inch.

As illustrated in FIG. 1, line 64 is normally coupled to a source of compressed air by means of a conventional spring-biased control valve 68, the latter receiving compressed air from a conduit 70 and supplying the same to line 64. The compressed air in line 64 forces the spool 44 upwardly because of pressure exerted on the lower side of land 50. At this time lines 24 and 60, joined by means of coupling 72, are vented at exit port 74 of control valve 68. However, when actuator 78 is depressed against the bias of spring 80, compressed air from conduit 70 is diverted to lines 24 and 60 while line 64 is vented at exit port 82.

Control valve 68 is illustrated with the actuator 78 depressed in FIG. 2 and, as can be seen, this reversal in the direction of air pressure as between the ends of cylinder 36 forces spool 44 downwardly, since air pressure is exerted against the upper end of land 48 rather than against the lower end of land 50.

Conduit 38 is joined to supply tank 84 by means of tubing 86 which extends below the level 88 of a substance which it is desired to dispense. Supply tank 84 is closed except for the entrance of tubing 86 and air pressure line 90. Application of pressure via line 90 tends to force a substance contained within the tank out through tubing 86. The substance may be pressurized in another manner, e.g. by a pump or gravity head. For initially starting the system there must be positive priming of the supplied material, at which time plug 76 is removed.

The present invention can accommodate substances which are quite viscous or which have a varying consistency. Some examples are the various syrups, sauces, jellies, jams, and the like which may be dispensed upon ice cream preparations, or pickle relish which may be dispensed upon hamburger sandwiches. The system according to the present invention is also adapted for dispensing substances which may be relatively dry, such as putty, or substances which comprise up to 97 percent solid material. For some purposes the dispensing system according to the present invention can be duplicated in part, with a common control valve 68, for simultaneously dispensing plural predetermined charges.

For the position of the control valve 68 as illustrated in FIG. 1, a passage is provided within spool valve 34 for material flowing from tubing 86 into the spool valve via conduit 38 and out of the spool valve via conduit 42. A length of tubing 92 joins conduit 42 to conduit 20 of cylinder 10 and consequently, the air pressure from line 90 forces a charge into cylinder 10. This substance fills the dispensing cylinder 10, forcing piston 12 against bumper 30. In the normal or ready position of the system, the cylinder will be thus charged with the quantity of substance which is to be dispensed. Now, when actuator 78 is depressed, as illustrated in FIG. 2, air pressure is simultaneously delivered to lines 24 and 60. Air pressure from line 60 forces spool 44 downwardly, and if semi-solid particles tend to block port 39, land 48 immediately slices off said particles whereby no substantial delay in valve operation is experienced. The pilot-operated valve 34 now provides a passage between conduits 42 and 40, and air pressure from line 24 to the right of piston 12 in cylinder 10 forces piston 12 to the left substantially toward the end wall 94 of cap 16. A charge of substance theretofore contained within cylinder 10 is consequently delivered to outlet conduit 40 into or onto a waiting article or receptacle (not shown). Definite quantities of a substance are dispensed by the positive displacement provided according to the present system, regardless of viscosity, etc.

Connection 22 threadably received in cap 16 of dispensing cylinder 10 is coupled, via pipe 96, to a hand-operated flushing valve 98 for selectively delivering a cleaning liquid, such as water, from supply main 100. Valve 98, operated by control handle 102, delivers water for flushing cylinder 10 and back through tubing 92 to pilot-operated valve 34 where the liquid either leaves by conduit 40 or conduit 38, depending upon the position of actuator 78 of control valve 68. If supply tank 84 is empty, then tubing 86 may be left connected to both tank 84 and conduit 38 whereby tubing 86 and tank 84 may also be flushed. Otherwise tubing 86 may be disconnected from the spool valve, or the supply tank, or both. Thus, with control handle 102 operated to supply water pressure within the system, actuator 78 may be alternately depressed and released whereby the cleaning liquid completely flushes the system. The straight-sided cylinders and the open ports in these cylinders facilitate adequate cleaning of the system which would ordinarily not be possible if various spring-biased check valves and the like formed a part of the system. There is substantially no mass restriction in the present system as might impede either the proper dispensing of an accurately predetermined charge of the dispensed substance, or which might impede the proper cleaning of the system. The ready ability for system cleaning is especially desirable when the system is employed for the dispensing of various foodstuffs.

Although plastic material is preferred for the component parts of the present system, it is appreciated the present invention is not limited thereto and other materials may be employed. For example, stainless steel components are suitable.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I Claim:

1. A dispensing system for dispensing semibulk foodstuff material, said system comprising:
   a dispensing cylinder having a floating piston self-contained therewith and having an opening proximate a first end thereof for ingress and egress of a dispensed substance,
   tubular conduit means coupled to said opening,
   a pilot-operated spool valve for directing a substance to be dispensed into said dispensing cylinder through said conduit means in a first position of said spool valve, while providing an exit for dispensed material from said dispensing cylinder through said conduit means in a second position of said spool valve,
   a pneumatic control valve for receiving a supply of compressed air and alternatively directing the same to respective ends of said spool valve for pilot operation of said spool valve,
   and a pneumatic coupling means from said control valve to said dispensing cylinder for also directing compressed air from said control valve into the second end of said dispensing cylinder behind said piston for moving said piston in a direction for dispensing said Substance at the same time said control valve operates said pilot-operated valve to provide an exit for dispensed material,
   said spool valve including a cylinder and a spool having a central shaft and a pair of lands joined thereby, the interior of said spool valve cylinder having a straight cylindrical wall interrupted by coupling ports for providing ingresS and egress as well as shearing of dispensed material, said spool providing alternative coupling of said ports in first and second positions of said spool,
   said pneumatic control valve comprising a spring-biased control valve having an operating actuator, said control valve having a position wherein said operating actuator is depreSsed against spring bias to direct compressed air into said second end of said dispensing cylinder behind said floating piston to operate the same as well as to a first end of said spool valve for operating said spool valve to provide said exit for dispensed material, said control valve in its normal unoperated position directing compressed air to a second end of said spool valve for operating sad spool valve to direct said substance into said dispensing cylinder, an additional fluid connection to said first end of said dispensing cylinder for flushing said system in the alternative to dispensing foodstuff material with said system, and valve means in said fluid connection.

2. The system according to claim 1 wherein said spool valve lands each have a diameter at least twice that of said central shaft.

3. The system according to claim 1 wherein said dispensing cylinder and said floating piston are of substantially uniform inner and outer diameter respectively, said system further including an adjustable stop within said dispensing cylinder and extending from the end of said dispensing cylinder behind said piston for limiting the movement of said piston within said dispensing cylinder.

4. The system according to claim 1 wherein:
   said ports of said spool valve have a diameter of at least approximately three-eighths inch,
   and wherein said lands are cylindrical with the difference between the diameter of said central shaft and the diameter of said lands being also at least approximately three-eighths inch in diameter.

5. The system according to claim 1 wherein said pneumatic control valve is provided with exit ports to vent air from cylinders not operated.

6. A dispensing system for dispensing semibulk foodstuff material, said system comprising:
   a dispensing cylinder having a substantially uniform inside diameter throughout and provided with first and second end caps,
   a floating piston slidable within said dispensing cylinder and being self-contained within said dispensing cylinder,
   said first end cap having a single exit and entrance conduit, and said second end cap having a pneumatic line connection as well as an adjustable stop positionable externally from said second end cap,
   a pilot-operated spool valve comprising a cylinder and having first and second ends, a spool slidable within said spool valve, said spool having a central shaft and a pair of lands joined thereby each having a diameter at least twice that of said central shaft, the difference between the diameter of said central shaft and the diameter of said lands being at least three-eighths inch, the interior of said cylinder having a straight cylindrical wall interrupted by first, second and third circular coupling ports for providing ingress and egress of dispensed material, said ports each having a diameter of at least three-eighths inch, first conduit means connected to the first coupling port, second conduit means connected to the second coupling port, and third and dispensing conduit means connected to the third coupling port, said coupling ports being spaced along said cylinder from one another such that the spacing between said lands connects the first port to the second port in a first position of said spool, while connecting the second port to the third port in a second position of said spool,
   a closed supply tank for the substance to be dispensed, tubing having one end connected to said first conduit means of said spool valve and having a second end disposed below the level of said substance in said supply tank, and means for providing air pressure above the level of material in said supply tank,
   tubular means connecting said second conduit means of said spool valve to the conduit at the first end cap of said dispensing cylinder,
   and a pneumatic control valve for receiving a supply of compressed air and directing the same between a pair of outlets, said control valve having a bias spring at one end thereof, a manually operable actuator at the opposite end thereof and valving means therebetween for alternatively supplying air to one of two outlets, a first line connecting one outlet of said control valve to a second end of said spool valve and a second line connecting a second outlet of said control valve to a first end of said spool valve as well as to said line connection on the second end cap of said dispensing cylinder, wherein the control valve in the nonactuated position provides air to said first line,
   said system further including an additional connection in the first end cap of said dispensing cylinder, and means including a control valve for providing flushing fluid to said additional connection.

* * * * *